United States Patent [19]

Stalley et al.

[11] 4,035,832

[45] July 12, 1977

[54] DIGITAL SHIFT REGISTERS FOR VIDEO STORAGE

[75] Inventors: Anthony Donald Stalley, Fleet; John Albert Coffey, Newbury, both of England

[73] Assignee: Quantel Limited, England

[21] Appl. No.: 605,356

[22] Filed: Aug. 18, 1975

[30] Foreign Application Priority Data

Aug. 20, 1974  United Kingdom ............. 36565/74

[51] Int. Cl.² .......................................... H04N 5/04
[52] U.S. Cl. ................................................... 358/8
[58] Field of Search ............ 178/6.8, 6; 179/15 AF; 340/174 SR; 358/8

[56] References Cited

U.S. PATENT DOCUMENTS

| | | |
|---|---|---|
| 3,646,445 | 2/1972 | Reindl .......................... 179/15 AF |
| 3,830,971 | 8/1974 | van de Polder .................... 178/6.8 |
| 3,876,825 | 4/1975 | Murakami .......................... 178/6 |

Primary Examiner—Robert L. Griffin
Assistant Examiner—Michael A. Masinick
Attorney, Agent, or Firm—Dowell & Dowell

[57] ABSTRACT

A method of storing digital information comprising applying the information in the form of coded pulses to an input of at least one register by means of clock pulses and shifting the information within the register by additional clock pulses between writing in and reading out the information. The number of additional pulses applied is equal to the difference between the total register length and the number of clock pulses used to enter the coded pulses, whereby the information within the register is available to be read out on application of read out pulses to the register.

13 Claims, 2 Drawing Figures

DIGITAL SHIFT REGISTERS FOR VIDEO STORAGE

BACKGROUND TO THE INVENTION

This invention relates to the use of digital shift registers for the storage of digital information and more particularly to the storage of video signals in digital television equipment. The conversion of analogue video signals to digital form and the control for writing in of the digital signals into storage means (e.g. shift registers) and the subsequent reading out of the digital information from the store is known for example from U.S. Pat Nos. 3,860,952; 3,752,912; 3,830,971. When handling a television signal in digital form it is common practice to sample the analogue video signal for conversion to the digital format at a rate, at or near, three times the colour sub carrier frequency. This choice of sampling frequency satisfies the requirements of sampling theory and minimizes the visibility of spurious patterns produced by the sampling process. Having made this choice of sampling rate, the word rate of the digital code describing the television signal is fixed as are the parameters of the television system itself. The active picture period of each television scanning line is therefore sub divided into a minimum number of digital words sufficient to embrace the information period. In the case of an American NTSC colour television signal having an active line period of 53.5 microseconds and a colour sub carrier frequency of 3.58 MHz, the minimum number of words per active line = 53.5 microseconds times 10.7 MHz, i.e. 575 words.

Where digital shift registers are used to store a television signal in increments of one scanning line duration, it is necessary to choose components which have sufficient capacity, i.e. the correct length in the case of shift registers, and also an adequate operating speed. Currently available large scale integrated circuit shift registers have a limited operating speed which requires that the 10.7 MHz word rate be demultiplexed by a factor of 2, 3 or more, to reduce the rate at which the shift register must be clocked. If, for example, the digital word rate is demultiplexed by a factor of 3, then every third word is allocated to one of three parallel shift registers each with a length one third of the total required. If in the example taken the number of words per active line is rounded up to the nearest whole number divisible by three, 576 words, then the shift register length required in each of three parallel demultiplexed paths is 192. This length of 192 can be assembled for each register from three separate 64 bit shift registers in cascade. 64 happens to be one of a number of commonly available shift register lengths. Therefore, a system using a demultiplexing factor of three and registers of length 192 would require a total of nine registers of 64 bit length for each bit of the digital word. If for example the word comprises: 8 bits (in parallel form), then 8 register arrangements as described above will be required. The number of 64 bit registers will be 9 × 8 = 72. So, in view of the relatively small size of the 64 bit register, a more economic solution is required.

SUMMARY OF THE INVENTION

According to the invention we provide a method of storing digital information, comprising applying said information in the form of coded pulses to an input of at least one store by means of write in clock pulses and shifting said information within said store precisely to its output end by additional clock pulses after writing in said information, the number of additional pulses being equal to the difference between the total store length and the number of write in clock pulses used to enter the coded pulses, whereby the information within said store is immediately available to be read out on application of read out pulses to said store.

In this way, a more attractive solution is to be found in the use of fewer and readily available shift register integrated circuits having a length of 256 bits. When multiplexed together, three of these registers will provide an ample combined length of 768 bits.

As the combined length exceeds the total number of sampling rate intervals in one line repetition period, i.e. active line period plus blanking period, this excess capacity precludes the use of the present invention where a throughput delay of one line repetition period is required. However, in applications where it is not necessary to recycle the information within a line period, this limitation can be accommodated. An example of such an application is in digital time base correction where shift registers can be used to provide a delay which varies so as to cancel timing perturbations present on the input signal.

DESCRIPTION OF THE PREFERRED EMBODIMENT

Figure 1:
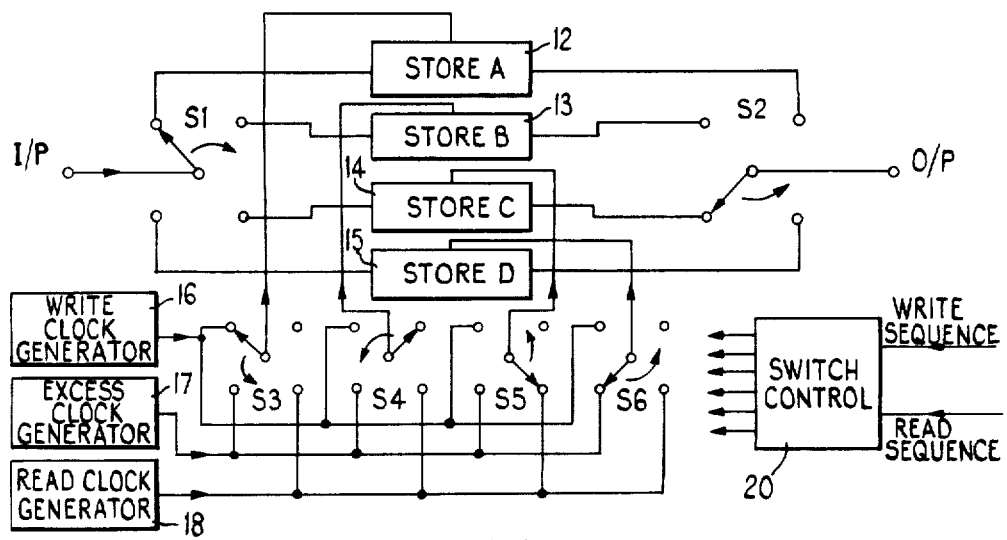
FIG. 1 shows a block diagram of one form of store arrangement that can be used in a time base corrector.

The stores A,B,C and D of FIG. 1 comprise shift register blocks 12,13,14 and 15 respectively. These blocks may each comprise three sets of shift registers to provide multiplexing as described above. The shift registers may be type 1402 MOS integrated circuits. Line by line the input signal is written into the shift register stores A,B,C and D in sequence, the stores during writing in being controlled by the pulses from the write clock generator 16. As the store input and output signals are in digital form, the input and output one-pole four positions switches S1 and S2 can be realised simply using commonly available logic elements. The information written into stores A to D in sequence and subsequently read from the stores in the same sequence by means of clock pulses from the Read clock generator 18 comprises the active portion of each television line. The input and output switches can, therefore, be operated conveniently during the picture blanking intervals, which occur between the active picture periods. Following a dwell of an average about one line period, the same signal is read from each store with the time base instabilities removed. After a further interval of on average about one line duration, each store is ready to be written into again. In this case, timing errors of up to ±1 line period can be accommodated.

The arrangement of FIG. 1 only shows the handling of digital words of 1 bit, but it will be appreciated that for words of more than 1 bit a similar arrangement will be required for each bit of the digital word as mentioned above. Thus 24 register chains could be provided capable of receiving parallel coded input signals, the chains being closed simultaneously by the write in clock pulses.

Figure 2:
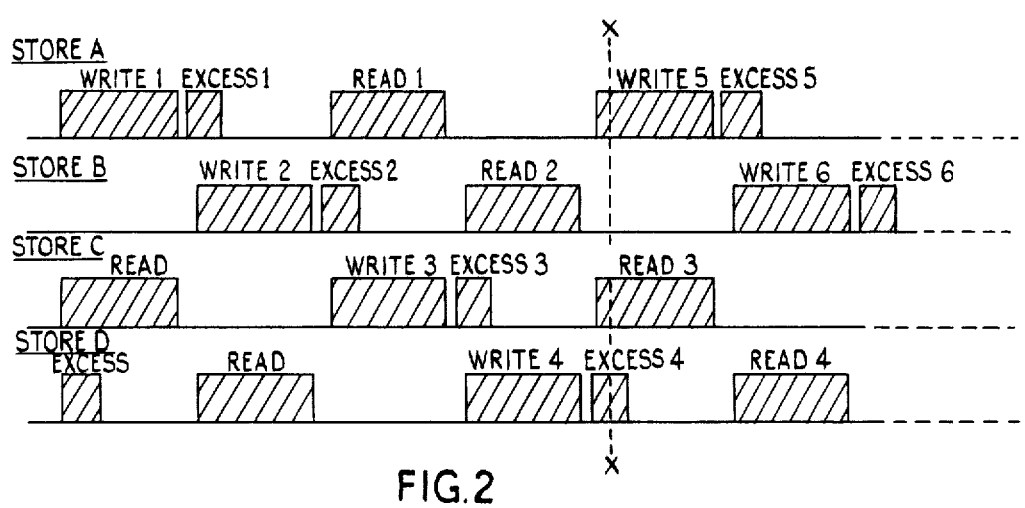
FIG. 2 shows groups of clock pulses corresponding to periods of data movement within the stores.

The stores can be realised with 256 bit shift registers. Since there is excess capacity in the store (i.e. the difference between 576 and 768) a further movement of the information along precisely to the end of the register is required, that is, a number of excess clock pulses must be applied to the store which is equal to the difference between the total store length and the number of clock pulses (576) used to enter the picture information (see FIG. 2). These excess clock pulses are applied following the store write clock pulses by means of the excess clock generator 17, and they serve to advance the picture information up to the far end of the shift register ready for read-out. The picture information then waits to be read on command from the store.

The three series of clock pulses respectively from the write clock generator 16, the excess clock generator 17, and the read clock generator 18 are selected in turn and fed to the four stores 12–15 by switches S3 to S6 which sequence continuously. Switches S1 to S6 are operated by a switch control circuit 20 which takes timing information from both the data writing and reading sequences. Each switch may be driven by a four stage ring counter (not shown) which maintains the correct sequence with respect to the other switches. The switch positions shown in FIG. 1 correspond to the instantaneous conditions along line XX in FIG. 2.

With the switches in the position shown in FIG. 1, input data is being written via switch S1 into store A which is receiving write clock pulses via switch S3. Data is stationary in store B which has no input or output connections and is receiving no clock pulses via switch S4. Data is being read out of store C via switch S2 under the control of read clock pulses through switch S5. Store D has no input or output connections, but the data within Store D is being advanced by a feed of excess clock pulses via switch S6.

Thus, the input switch of FIG. 1 is connected to store A during the writing of lines 1, 5, 9, 13, etc., and to store B for the writing of lines 2, 6, 10, 14, and so on. The output switch is subsequently connected to each of the stores in turn following the same repetitive sequence. The writing and reading operations of any one store never occur simultaneously, and the rates can, therefore, be different. By this means, the picture information can be written into each store in turn at a non-uniform rate, varying in sympathy with the irregular timing of a signal coming for example from a video tape recorder.

The reading of that same information can take place subsequently at a completely unrelated time from each store in turn, under the control of a sequence of clock pulses occurring at a uniform rate. The dwell between writing and reading each store would vary according to the magnitude of the input signal timing error.

The use of a group of excess clock pulses in no way affects the fundamental operation of the system, but permits the use of commonly available storage devices. The position of input and output switches is unimportant during the excess clocking sequences. At these times the information written into the stores is merely being shifted along the excess register length, to await reading on command with the output switch correctly positioned.

The same data movement could be achieved by supplying a similar number of excess clock pulses to each store immediately prior to the read sequence. Alternatively, the excess clocking could be divided into two or more bursts of clock pulses, between write and read. In each case, the effect of this technique is to accommodate the superfluous register length.

We claim:

1. A method of storing digital video information to provide timing correction therefor, comprising:
   a. applying said information in the form of coded pulses to an input of at least one store by means of a predetermined number of write in clock pulses occurring at a non-uniform rate in dependance on timing errors present on the incoming video signal,
   b. shifting said information within said store by additional clock pulses after writing in said information, the number of additional pulses being a predetermined number equal to the difference between the total store length and the number of write in clock pulses used to enter the coded pulses, and
   c. reading out said digital information from said store at a uniform rate on application of read out pulses to said store.

2. A method according to claim 1, wherein said coded pulses are written into each of a plurality of stores formed by one or more shift registers in turn by means of the clock pulses, the predetermined number of additional pulses applied to each store being equal to the difference between the total length of said store and the number of clock pulses used to enter the information into said store, whereby the information within each store is available to be read out on application of read out pulses to each of the stores.

3. A method according to claim 2, wherein said digital information comprises groups of coded pulses, each group being fed in turn to one of said stores, said shift registers being arranged in each store to comprise a demultiplexed system.

4. A method according to claim 3, in which the groups of coded pulses are applied to each of said stores for a duration equal to one active television line period, the switching occurring during the picture blanking intervals between the active line periods.

5. A method according to claim 4, wherein the information in said stores is read out line by line sequentially from said stores by said clock pulses occurring at a uniform rate.

6. An apparatus for storing digital video information to provide time base correction thereof, comprising:
   a. at least one store,
   b. means for providing a predetermined number of write in clock pulses occurring at a non-uniform rate in dependance on timing errors present on the incoming video signal to said store to write in said information,
   c. means for providing a predetermined number of additional clock pulses to shift the information within said store, the number of additional pulses being equal to the difference between the total store length and the number of clock pulses used to enter the information whereby the information is available to be read out, and
   d. means for providing read out clock pulses at a uniform rate for reading out said information from said store.

7. An apparatus according to claim 6, wherein there is provided a plurality of stores formed by shift registers, input switch means for switching said coded pulses to each of said stores in turn, means for switching write in clock pulses to one store when the coded pulses are switched to said store, and means for switching additional clock pulses to said one store for shifting the information therein, the number of additional pulses being equal to the difference between the total store length and the number of clock pulses used to enter the information into said store, whereby said information is available to be read out.

8. An apparatus according to claim 7, wherein said input switch means is provided to switch groups of pulses to each of said stores in turn.

9. An apparatus according to claim 7, wherein each of the shift registers comprises 24 register chains capable of receiving parallel coded input signals, said chains being clocked simultaneously by said write in clock pulses.

10. An apparatus according to claim 7, wherein said input switch means effects switching of said coded information to each of said stores, for a duration equal to one active television line period, the switching operation occurring during the picture blanking intervals between the active line periods.

11. Apparatus according to claim 7, wherein output switch means are provided to effect sequential coupling of the outputs of the stores to an output terminal, the coded information in each store being read out when the respective store is coupled with said output terminal.

12. Apparatus according to claim 11, wherein four stores are provided, said input switch means comprising a four position switch having an input connectible with each of the four positions in predetermined sequence, said positions being connected to the inputs of the stores respectively, and said output switch means comprising a four position switch having its four positions connected to the outputs of the stores respectively, and an output connectible with each of the positions in a predetermined sequence.

13. Apparatus according to claim 12, wherein four multi-pole switches are provided, one of each of said poles being connected to the source of write in clock pulses, a second of each of said poles being connected to the source of said additional clock pulses, and a third of each of said poles being connected to the source of said read out clock pulses, each switch having an output connected to said poles in a predetermined sequence, the outputs of said multi-pole switches being connected to the command input of said stores respectively.

* * * * *